June 24, 1952 — E. G. WETTLAUFER — 2,601,677
COMBINATION DOOR PULL-TO AND ARMREST
Filed Feb. 9, 1949 — 4 Sheets-Sheet 1

INVENTOR.
Elmer G. Wettlaufer
BY Harness, Dickey & Pierce
ATTORNEYS.

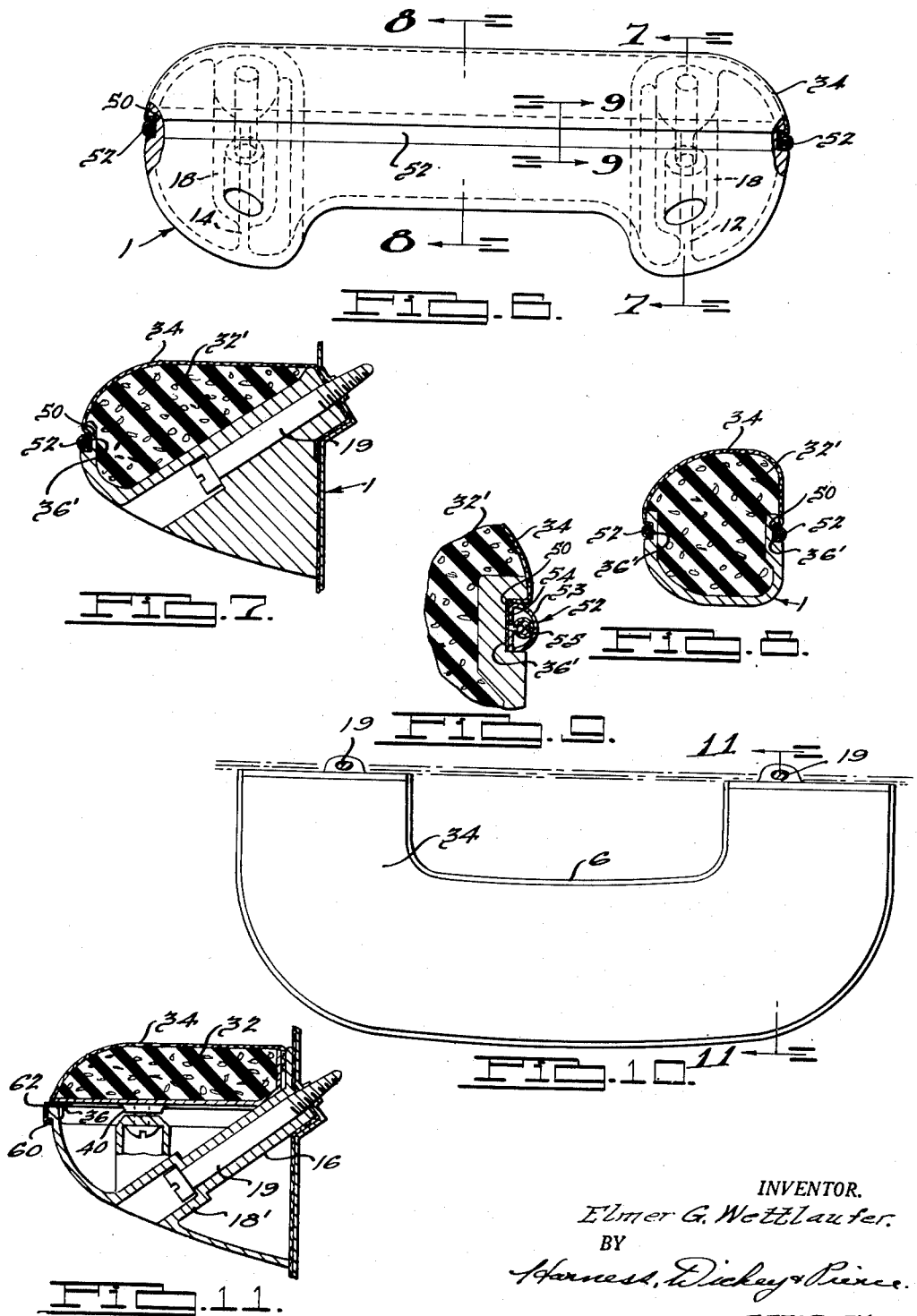

June 24, 1952 — E. G. WETTLAUFER — 2,601,677
COMBINATION DOOR PULL-TO AND ARMREST
Filed Feb. 9, 1949 — 4 Sheets—Sheet 3

INVENTOR.
Elmer G. Wettlaufer
BY
Harness, Dickey & Pierce
ATTORNEYS.

June 24, 1952     E. G. WETTLAUFER     2,601,677
COMBINATION DOOR PULL-TO AND ARMREST
Filed Feb. 9, 1949     4 Sheets-Sheet 4
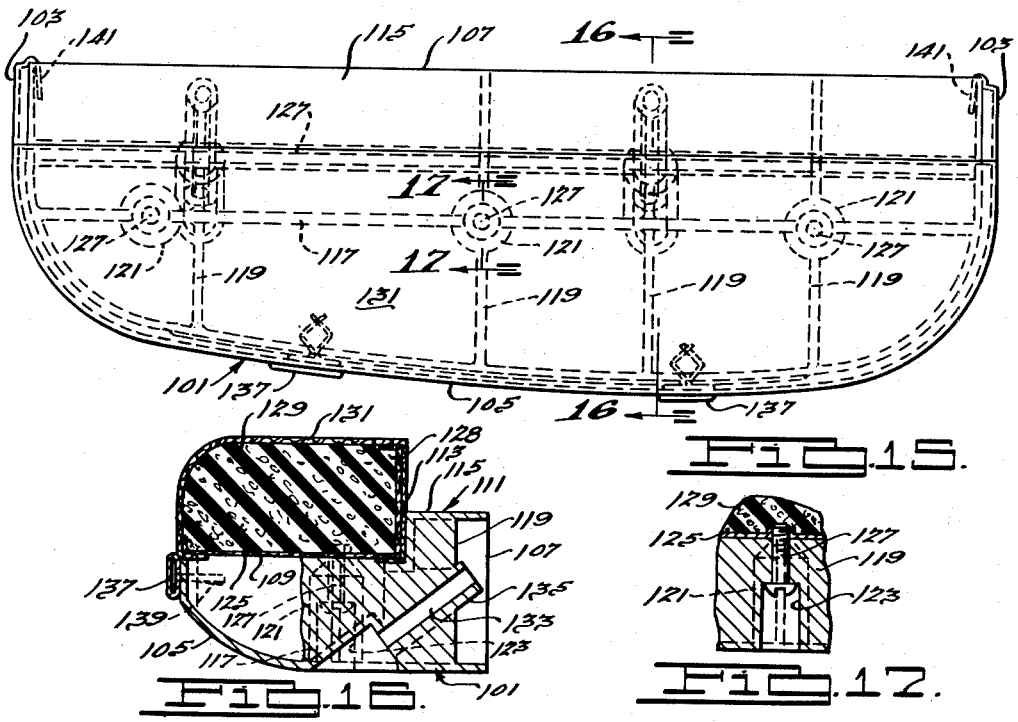
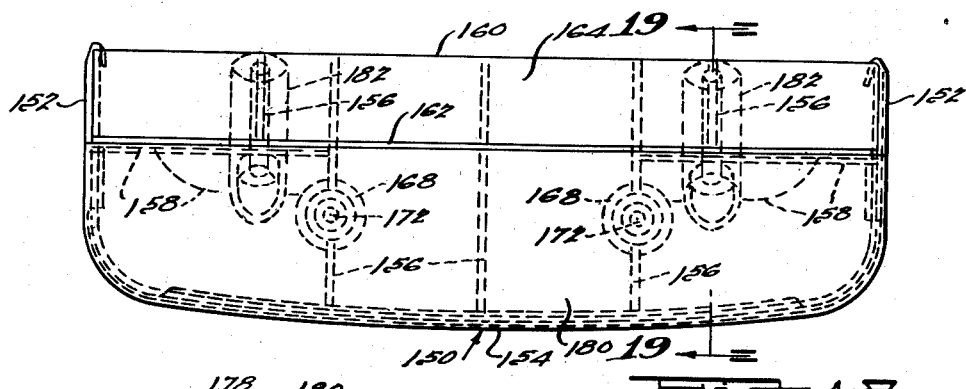
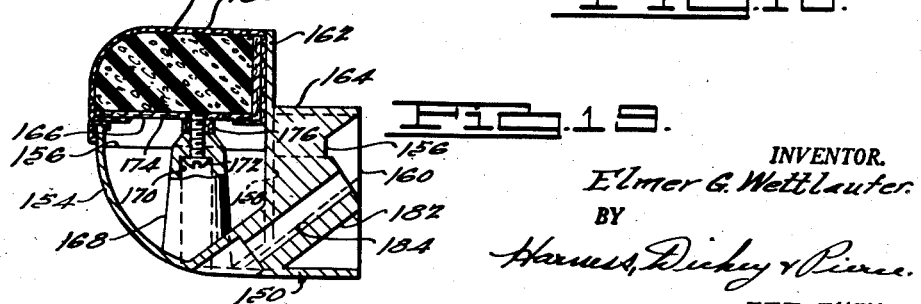
INVENTOR.
Elmer G. Wettlaufer.
BY
Harness, Dickey & Pierce
ATTORNEYS.

Patented June 24, 1952

2,601,677

UNITED STATES PATENT OFFICE 2,601,677

COMBINATION DOOR PULL-TO AND ARMREST

Elmer G. Wettlaufer, Bloomfield Hills, Mich.

Application February 9, 1949, Serial No. 75,456

22 Claims. (Cl. 155—198)

This invention relates to arm rests such as may be used in automobiles to increase the comfort of the occupants. The application is a continuation-in-part of the inventor's application Serial No. 648,915, filed February 20, 1946, now abandoned, entitled Combination Door Pull-to and Armrest.

It is an important object of the invention to provide an arm rest construction which may be molded from plastic material. The present invention therefore obtains the advantages associated with the use of plastics, viz., economy in manufacture, light weight, and attractive appearance and, in addition, provides a strong but comfortable arm rest.

Another object is to provide means for attaching an arm rest to a panel and a cushion member to the base member of an arm rest which are accessible from the outside of the panel but which are concealed from view.

An additional object is to provide an arm rest which may also be used as a door pull.

The features of construction whereby these and other objects of the invention are accomplished, are shown by way of illustration but not of limitation in the accompanying drawings wherein.

Figure 1:
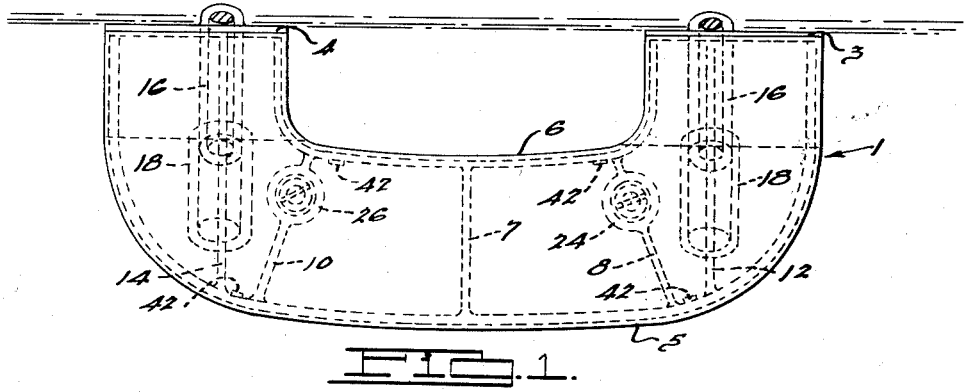
Figure 1 is a plan view of one form of arm rest embodying features of the invention.
Figure 2:
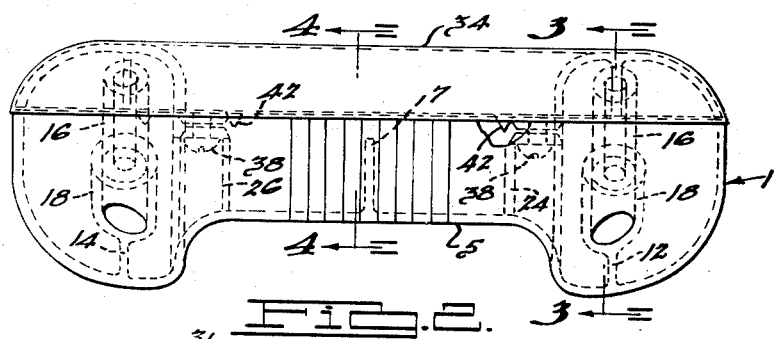
Fig. 2 is a front elevation of the arm rest of Fig. 1.
Figures 3, 4:
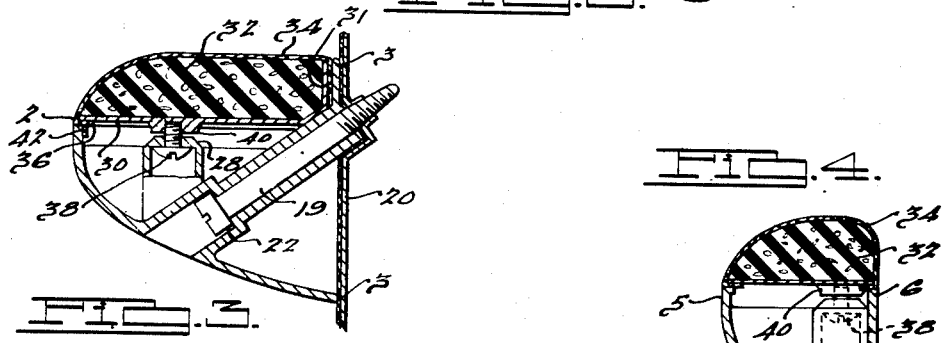
Figure 5:
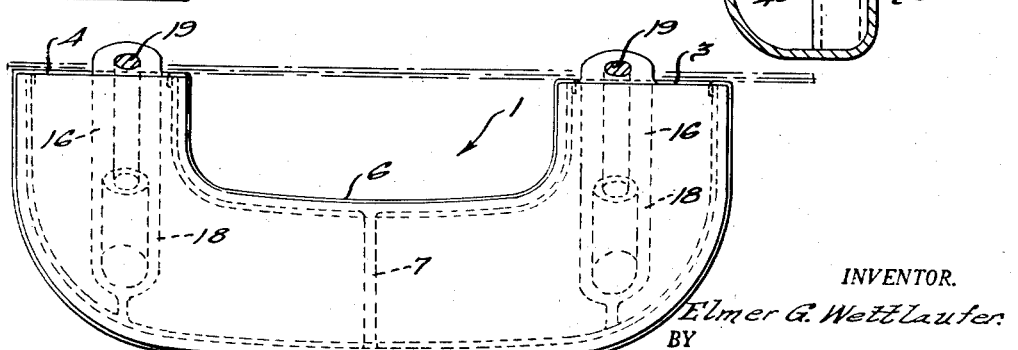
Figure 12:
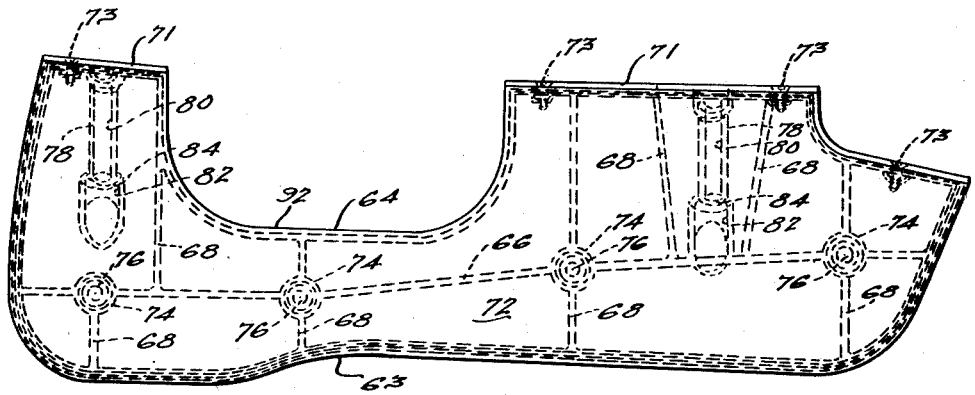
Figure 13:
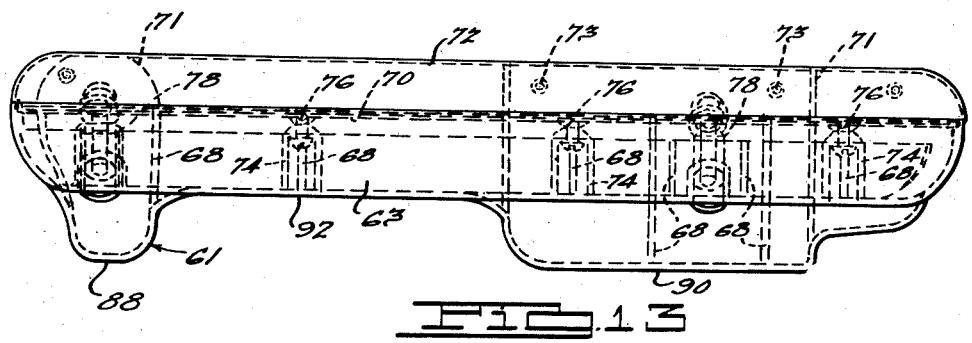
Figure 14:
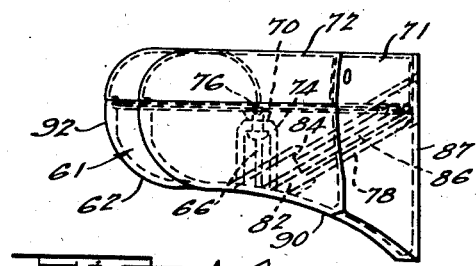

Figs. 3 and 4 are cross sections taken on the lines 3—3 and 4—4 of Fig. 2;

Fig. 5 is a plan view of another form of arm rest embodying features of the invention;

Fig. 6 is a front elevation, partly in section, of the arm rest shown in Fig. 5;

Figs. 7, 8, and 9 are cross sections taken on the lines 7—7, 8—8, and 9—9 of Fig. 6;

Fig. 10 is a plan view of another form of arm rest;

Fig. 11 is a cross section taken on the line 11—11 of Fig. 10;

Fig. 12 is a plan view of another form of arm rest;

Fig. 13 is a front elevation of the arm rest of Fig. 12;

Fig. 14 is a right end view of the arm rest of Fig. 12;

Fig. 15 is a plan view of a modified form of the invention;

Figs. 16 and 17 are cross sections taken on lines 16—16 and 17—17 of Fig. 15;

Fig. 18 is a plan view of another modified form of the invention; and,

Fig. 19 is a cross section taken on the line 19—19 of Fig. 18.

The improved arm rest has a base member 1 which appears C-shaped in plan and U-shaped in cross section. It, therefore, has an open top 2, and end portions 3 and 4 which may be partially or completely open or walled as desired. It will be recognized that the base member 1 comprises essentially a shell with upright or upturned side walls 5 and 6. Upright stiffening webs 7, 8, and 10 are provided to impart strength and rigidity to the base member so that it may be molded from plastic material. These webs interconnect the bottom of the base member and its side walls 5 and 6. Additional stiffening webs 12 and 14 extending from the wall 5 and terminating adjacent the ends 3 and 4 of the base member may also be provided. Columnlike protuberances or enlargements 16 are formed in the webs 12 and 14 to extend diagonally or in an inclined manner from the ends 3 and 4 to the bottom of the base member 1. The columns 16 are apertured but are enlarged at 18, adjacent the bottom of the base member 1, which enlargements have larger apertures than the balance of the columns. These apertures open out through the bottom of the base member 1 and provide a radial shoulder 22 spaced inwardly of the bottom and contained within the member 1. A suitable screw 19 may be placed in each aperture to attach the base member to the panel 20 and it will be apparent from Fig. 3 that the head thereof will seat on a shoulder 22 and be concealed from view. In this embodiment, it will be evident that the panel 20 is provided with a recess to receive the portions of columns 16 which extend beyond the plane of the ends 3 and 4.

The webs 8 and 10 are provided with hollow enlargements to form upright columns 24 and 26. These columns have apertured top walls 28 whereby they are adapted to contain and cooperate with screw members. A plate 30, preferably formed of metal, is supported on the top edges of the side walls 5 and 6 and is contoured to conform to and close the opening 2. The columns 24 and 26 may extend beyond the top edges of the webs 8 and 10 of which they form a part, or may not, as desired, the former arrangement being here shown. Thus, they terminate in a position of engagement or incipient engagement with the under side of the plate 30. The webs, therefore, in addition to stiffening the base member 1 serve to support the plate member 30 and distribute the load to the shell 1 when some one leans on the arm rest. The plate 30 may have an upright flange 31 adjacent the ends 3 and 4 of the base member 1. A soft resilient member 32 of sponge rubber or the like of a desired shape and thickness is carried by the plate 30 and is covered by a flexible material 34 or fabric, such as that sold under the trade name "Koroseal." The peripheral edges 36 of this covering 34 are clamped between the side walls 5 and 6 and the plate 30, and also between the flange 31 and ends 3 and 4, by screws 38 contained within the columns 24 and 26 which threadably engage the plate and secure it to the webs 8 and 10. If desired, the plate 30 may be provided with pad portions 40 to threadably receive the screws 38.

In order to provide permanent attachment, the resilient pad 32 and the covering 34 and the edges 36 thereof may be bonded or cemented to the plate 30 and to each other. To assist in locating and aligning the apertures in the pads 40 of the plate 30 with the apertures in column walls 28, the member 30 may have several downwardly extending tabs 42 thereon which define the inside surface of the top 2 of the base member 1 and fit the inner edge thereof to properly position the plate 30.

In the arm rest shown in Figs. 5–9, the webs 8 and 10 have been eliminated from the base member 1 inasmuch as no plate member 30 is used. The apertured column members 16 in the stiffening webs 12 and 14 are used again as means for attaching the arm rest to a panel. The web 7 may be used again for stiffening purposes as well as to take some of the load applied to the arm rest by a person leaning thereon. Instead of being supported on the plate 30, the resilient pad 32' is carried directly by the base member 1 and substantially fills the hollow interior thereof. The edges 36' of the covering 34 may be secured to the side walls 5 and 6 in peripheral grooves 50. A metallic molding or trim strip 52 fits in the grooves 50, over the edges 36', to fasten the covering 34 to the base member 1 and conceal the ragged edges 36' of the covering. The strip 52 may have a semi-cylindrical portion 53 and, as shown in Fig. 9, have radial inwardly extending sides 54 which bottom in the groove 50 on the edges 36' of the covering 34. This construction provides a resilient or snap action to hold the strip 52 in the groove 50. To further hold the strip in place, the ends thereof (see Fig. 5) may be bent around the ends 3 and 4 of the base member 1. In order to prevent deformation of the semi-cyclindrical portion 53, the hollow interior of the strip 52 may contain a tough core member 55 which may be a rope or the like inserted in the strip during the fabrication thereof.

In the construction of Figs. 10 and 11, the base member is slightly modified to provide a different trim construction. In this arrangement a peripheral flange 60 is formed around the outer top edge of the base member and an angle-shaped trim strip 62 is secured thereto by suitable means such as cementing or bending the ends thereof around the ends 3 and 4 of the base member.

The construction shown in Figs. 12–14 provides an increased surface area for arm resting purposes. The base member 61 comprises, as before, a shell having upright side walls 63 and 64 and a plurality of upright stiffening webs. Because of its increased length, the shell may have a longitudinal upright web 66 which is intersected by several spaced lateral upright webs 68. These webs terminate near the open top side of the shell and are thus in a position to lend support to the plate member 70 which covers this open side. The plate member 70 has a resilient pad and fabric 72 attached thereto by suitable means as already shown in Figs. 1–4. The base member 61 may have an upright flange 71 on its panel side top edge to which the flange on the plate 70 may be secured by screws as shown at 73. The intersections of the longitudinal web 66 and certain of the lateral webs 68 are enlarged to provide hollow columns 74. The columns 74 may be employed in the manner described in connection with the columns 24 and 26 of Figs. 1–4 to house screws 76 for securing the plate 70 and pad 72 to the base member 61. The columns also serve to assist the top edges of the walls 63 and 64 in supporting the plate 70.

Internal inclined columns 78 may be provided for housing screw means for attaching the arm rest to a panel. These contain aligned apertures 80 and 82 of different diameters so as to provide radial shoulders 84 within the columns. The columns 78 preferably have different outer diameters corresponding to the aperture diameters in such a manner as to provide a substantially uniform wall thickness, thus facilitating the formation of the member from plastic by molding methods. It may be noted that the webs, columns, and the base members are of substantially uniform thickness in all embodiments for this purpose. The columns 78 are preferably formed in inclined transverse webs 86 and open into the side or panel engaging ends of the base member 61 which may be walled as shown at 87. The base member 61 may be deformed downwardly as shown at 88 and 90 on either side of an intermediate portion 92 to provide the increased depth required for the inclined columns 78. The apertures 82 in the columns open into the portions 88 and 90 and screws may be inserted therein and concealed though serving the purpose of attaching the arm rest to a panel in the manner described in connection with Figs. 1–4.

The arm rest of Figs. 12–14 has the portion 92 spaced from the panel engaging sides of the base member 61. This is adapted to serve as a hand grip whereby the arm rest may be used additionally as a door pull. The portion 92 has its counterpart in the intermediate portions of the arm rest embodiments described above. In each of these embodiments, the intermediate portion is not only spaced from the panel but there is an enlarged aperture or cutout, as represented by the interior of the C, which permits a hand to encircle the arm rest when it is desired to close a door to which it may be attached.

The modified forms of the invention shown in Figs. 15–19 differ in principle from the forms already described only in the means provided for a hand grip whereby the arm rest serves as a door pull. In the forms of Figs. 15–19 there is a portion which is spaced from the panel engaging side of the arm rest but this is grasped by the fingers of the hand rather than encircled by the palm as in the preceding embodiments.

In the embodiment of Figs. 15–17, the base member 101 comprises a shell having its ends 103 and a side 105 upturned so that the other side 107 as well as a part 109 of the top are open. The open side 107 is the panel engaging side and inwardly extending therefrom for a short distance is the ledge portion 111 which is formed on the base member by means of an upright wall or flange 113 bordering a side of the opening 109 and a top wall 115. The base member 101 has a longitudinal upright stiffening web 117 and several spaced upright lateral stiffening webs 119. Several columns 121 may be formed in the web 117 with counterbored recesses 123. The columns 121 and the portion of the webs 119 which rise into the opening 109 preferably terminate in a plane with the top edge of the side 105 and together form a support structure for the plate member 125. This member is secured to the columns 121 by screws 127 which are concealed in the counterbores 123. The plate member 125 has an upright flange 128 which rises a substantial distance above the ledge 111. A resilient pad 129 is attached to the plate 125 and these two members are covered by a suitable fabric material 131. The flange 128 provides a surface which may be grasped by the fingers to pull a door on which the arm rest may be fastened.

The arm rest is fastened to a door by means of screws (not shown) extending through counterbores 133 in the inclined columns 135. These columns are formed in certain of the webs 119 and open into the under side of the base member 101 and terminate in or inwardly of the plane defined by the edge of the base member side 107 which engages the panel surface.

If desired, a trim strip 137 may be attached to the base member 101 by means of keys or clips 139 and bending of the ends around the edges of the base member wall as shown at 141.

In the embodiment of Figs. 18 and 19, the base member 150 is upturned on its ends 152 and a side 154 and has a plurality of lateral upright stiffening webs 156 joined by a pair of longitudinal upright stiffening webs 158 extending inwardly from the ends 152. The panel engaging side 160 of the base member 150 opposite the side 154, as in the preceding embodiments, may or may not be open, as desired. Inwardly from this side, the base member has a continuous upright web or flange 162. On the panel side of the flange 162 the top of the base member 150 is covered as shown by the wall 164 but on the outer side of the flange, the base member may be open on top, as before, as shown at 166. The webs 156 contain columns 168 having counterbores 170 which receive screws 172 for attaching the plate 174 to the base member 150. In this embodiment the columns 168 are shown as rising above the top edges of the webs 156 and cooperating with pads 176 on the under side of the plate 174 and with the edge of the opening 166 to support the plate 174. Resilient material 178 and covering fabric 180 may be attached to the plate 174 in the manners already indicated. Inclined columns 182 with counterbores 184 therein may be formed in certain of the webs 156 so as to open at one end into the under side at the other end into the open side 160 of the base member 150. This may receive screws for fastening the arm rest to a panel in the aforedescribed manner. With the arm rest so secured, an occupant may seize the flange 162 with his fingers to close the door to which the arm rest may be attached.

It will now be evident that since the invention may be embodied in many different forms, it is not intended to limit it to the specific structures shown and described. The particular merits of the invention in providing an attractive arm rest which may be economically manufactured by molding plastic material will be apparent to those in the art. From the standpoint of functional advantages, the web and column features are outstanding since they provide concealed means whereby the arm rest may be fastened to a panel and also increase the rigidity and durability of the arm rest and serve to support the resilient pad which engages the arm. Other advantages and modifications will appear to those skilled in the art.

What is claimed is:

1. An arm rest comprising a substantially C-shaped hollow base member having end walls and being of substantially U-shape in cross section, a pair of apertured recessed shoulders in the bottom wall of said member, each of said end walls having an aperture therethrough, one of said wall apertures being aligned with one of said shoulder apertures, the other of said wall apertures being aligned with the other of said shoulder apertures, said aligned apertures being adapted to receive means for securing said base member to a surface, a resilient member carried by said base member, and means securing said resilient member to said base member.

2. An article of the character described comprising a molded material thin-walled hollow member of substantially C-shape and having a substantially U-shaped cross section, webs extending across said U-shaped section and uniting the walls of said section at spaced points, one of said walls having an aperture therethrough opening outwardly through one of the end walls of said C-shaped member and adapted to receive a securing means for fastening said end wall to a surface, another of said webs having an aperture therethrough opening upwardly into the open top wall of said U-shaped section, means closing said open top wall and seating on the peripheral edge of said U-shaped section, and means extending through said last-named web aperture for securing together said closing means and said hollow member.

3. An article of manufacture comprising a body member having an outer wall having end portions extending substantially laterally to an intermediate longitudinal wall portion, said end portions terminating in a plane and being adapted to abut a supporting panel, said body member being provided with a pair of integrally formed tubular portions defining passageways extending interiorly of said body member in the general direction of said plane, said passageways each being provided with an annular shoulder spaced inwardly of the external wall of said body member and adapted to cooperate with shouldered fastening means extending through said passageways and beyond said plane for holding engagement with the panel.

4. The combination of claim 3 in which a cushion member is provided for the said body member, in which fastening means is provided on said cushion member, and in which said body member is provided with an integrally formed tubular portions defining a passageway extending interiorly of said body member in the general direction of said cushion member, said just-named passageway being provided with an annular shoulder spaced inwardly of the external wall of said body member and adapted to cooperate with a shouldered member extending through said just-named passageway and cooperable with said cushion member fastening means for holding said cushion member to said body member.

5. An arm rest for attachment to a supporting wall having a substantially vertical surface, said arm rest comprising a thin-walled, hollow, substantially inflexible casing of molded plastic material, said casing being open at the top, cushion means carried by said casing and closing the open top of the casing, said casing being formed to provide a front wall portion and a rear portion and spaced end portions integral with and connecting the first-mentioned portions, said rear portion being adapted to fit against such supporting wall surface, stiffening web means within the casing inter-connecting and formed integral with portions thereof, and aperture forming means in the casing and integral therewith adapted to receive and direct a securing element obliquely into such supporting wall for attaching said casing thereto.

6. An arm rest as set forth in claim 5 wherein said aperture forming means has an inlet opening in the bottom of said casing and extends upwardly from said inlet opening toward said rear portion.

7. An arm rest as set forth in claim 6 wherein said aperture forming means includes an inclined hollow tube portion.

8. An arm rest as set forth in claim 7 wherein said aperture forming means includes a web within the casing interconnecting spaced portions thereof and formed integral therewith and said tube portion is formed in said web.

9. An arm rest as set forth in claim 8 wherein said stiffening web means includes a web having a hollow column formed therein, said column having an inlet opening in the bottom of the casing and projecting upwardly from the bottom of said casing, said column opening toward said open top of said casing, said cushion means engaging and being supported on the top of said column, said column having a securing element therein connected to said cushion means and clamping said cushion means on the casing.

10. An arm rest for attachment to a supporting wall having a substantially vertical surface, said arm rest comprising a thin-walled, hollow, substantially inflexible casing of molded plastic material, said casing being open at the top, cushion means carried by the casing and closing the open top thereof, said casing being formed to provide a front wall portion and a rear portion and spaced end portions integral with and connecting the first-mentioned portions, at least one of said casing portions including a top edge, said cushion means being at least partially supported on said top edge, said rear portion being adapted to fit against such supporting wall surface, stiffening web means within the casing interconnecting and formed integral with portions thereof, and aperture forming means in the casing and integral therewith adapted to receive a securing element for attaching said casing to such supporting wall.

11. An arm rest as set forth in claim 10 wherein said stiffening web means includes a web that extends from the front wall portion to the rear portion of the casing.

12. An arm rest as set forth in claim 10 wherein said stiffening web means includes a web extending from end portion to end portion of said casing intermediate said front wall portion and said rear portion.

13. An arm rest as set forth in claim 10 wherein said stiffening web means includes substantially vertical webs extending from the front wall portion to the rear portion and from end portion to end portion of said casing.

14. An arm rest as set forth in claim 10 wherein the cushion means engages and is at least partially supported upon said stiffening web means.

15. An arm rest as set forth in claim 10 wherein said casing includes means formed integrally therewith engaging and supporting said cushion means and located intermediate the front wall portion and rear portion and intermediate the end portions of the casing.

16. An arm rest as set forth in claim 15 wherein the means for supporting the cushion means includes a hollow column having an inlet opening in the bottom of the casing and projecting upwardly from the bottom of said casing, said column opening toward said open top of said casing, and a securing element within said column connected to said cushion means and clamping it against the top of said column.

17. An arm rest as set forth in claim 16 wherein said cushion means includes a plate resting on said column and a resilient body secured on top of said plate and said securing element comprises a screw threaded into said plate, the balance of said screw outside of said plate being totally contained within said column.

18. An arm rest as set forth in claim 10 wherein said stiffening web means includes a web having a hollow column formed therein, said column having an inlet opening in the bottom of the casing and projecting upwardly from the bottom of said casing, said column opening toward said open top of said casing, said cushion means engaging and being supported on the top of said column, said column having a securing element therein connected to said cushion means and clamping said cushion means on the casing.

19. An arm rest as set forth in claim 10 wherein said casing includes a rear wall portion spaced forwardly of said rear portion and located intermediate said end portions and below the top of said casing, the outside surface of said rear wall portion providing hand grip means whereby the arm rest is adapted to serve as a door-pull.

20. An arm rest as set forth in claim 10 including hand grip means formed on the casing comprising a flange on the casing extending longitudinally and upwardly from a portion of the top of said casing intermediate the front wall portion and the rear portion.

21. An arm rest as set forth in claim 10 wherein said cushion means includes a plate having a flange formed thereon extending longitudinally and upwardly from the top of the casing and spaced forwardly from such supporting wall surface to provide hand grip means.

22. A casing for an arm rest to be attached to a supporting wall having a substantially vertical surface, said casing being substantially inflexible and formed of thin-walled molded plastic material, said casing being open at the top and formed to provide a front wall portion and a rear portion and spaced end portions integral with and connecting the first-mentioned portions, said rear portion being adapted to fit against such supporting wall surface, said casing including a vertical stiffening web formed inside the casing and integral therewith and joined to certain of said portions, said casing including a hollow vertical column formed integrally therewith and projecting upwardly from the bottom of the casing and opening toward said open top, said column being adapted to support a cushion means on the top thereof and to receive and house a securing element for clamping the cushion means on the casing, and aperture forming means in the casing and integral therewith and adapted to receive a securing element for attaching the casing to such supporting wall.

ELMER G. WETTLAUFER.

REFERENCES CITED

The following references are of record in the file of this patent:

UNITED STATES PATENTS

| Number | Name | Date |
| --- | --- | --- |
| 1,555,396 | Bourgon | Sept. 29, 1925 |
| 1,937,301 | Trautvetter | Nov. 28, 1933 |
| 2,068,009 | Doose | Jan. 19, 1937 |
| 2,203,413 | Hood | June 4, 1940 |
| 2,212,033 | Morley | Aug. 20, 1940 |
| 2,292,445 | Hilldring | Aug. 11, 1942 |
| 2,325,292 | Westrope | July 27, 1943 |